United States Patent Office 3,380,939
Patented Apr. 30, 1968

3,380,939
REACTION PRODUCTS OF UNSATURATED HETEROCYCLIC LACTONES WITH POLYHYDROXY COMPOUNDS
Richard A. Palm, Niederdollendorf, Harald H. O. Cherdron, Ittenbach, Hans H. W. Ohse, Oberdollendorf, and Friedrich W. A. G. K. Korte, Hangelar, Germany, assignors to Shell Oil Company, New York, N.Y., a corporation of Delaware
No Drawing. Filed June 25, 1965, Ser. No. 467,111
Claims priority, application Germany, July 16, 1964, S 92,084
13 Claims. (Cl. 260—9)

ABSTRACT OF THE DISCLOSURE

The invention provides new and particularly useful curable and soluble polymeric products comprising the reaction product of (1) an unsaturated heterocyclic substituted lactone such as, for example, beta-dihydro-2-pyranyl-beta-propiolactone with (2) a polyhydroxy containing compound such as, for example, glycerol, in the presence of an acid acting catalyst. The invention further provides cross-linked, insoluble infusible products obtained by reacting the aforedescribed soluble polymers with a polyfunctional compound such as, for example, polycarboxylic acids or anhydrides, polyhydric alcohols, amines or poly-epoxides.

This invention relates to a new class of polymeric products and to their preparation. More particularly, the invention relates to new curable polymeric products derived from unsaturated heterocyclic substituted lactones and to the use of the new products particularly in the preparation of moldings and castings and the like.

Specifically, the invention provides new and particularly useful curable and soluble polymeric products comprising the reaction product of (1) an unsaturated heterocyclic substituted lactone such as, for example, beta-dihydro-2-pyranyl-beta propiolactone with (2) a polyhydroxy containing compound such as, for example, glycerol, in the presence of an acid acting catalyst. The invention further provides cross-linked, insoluble infusible products obtained by reacting the aforedescribed soluble polymers with a polyfunctional compound such as, for example, polycarboxylic acids or anhydrides, polyhydric alcohols, amines or polyepoxides.

As a special embodiment, the invention provides new benzene soluble polymeric products comprising the reaction of a dihydropyranyl propiolactone having the structure

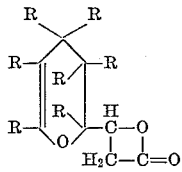

wherein R is hydrogen or an alkyl group, preferably containing 1 to 8 carbon atoms, with a polyhydric alcohol in the presence of an acid acting catalyst such as a Lewis acid or ammonium chloride. As a further special embodiment, the invention provides cross-linked products obtained by reacting the aforementioned benzene soluble polymers with a polyfunctional compound at a moderately high temperature, and under a wide variety of conditions.

It is an object of the invention to provide a new class of polymeric products and the method is their preparation from unsaturated heterocyclic substituted lactones. It is a further object to provide new solvent soluble polymers containing a plurality of active lactone groups. It is a further object to provide new polymeric lactones which can be used for many important applications in industry. It is a further object to provide new polymeric lactones which can be cross-linked to form valuable insoluble infusible products. It is a further object to provide new polymeric lactones which can be cross-linked with polyfunctional compounds to form valuable polymeric products. It is a further object to provide new polymeric lactones which can be used as curing agents for epoxy resins. These and other objects of the invention will be apparent from the following detailed description thereof.

It has now been discovered that these and other objects of the invention may be accomplished by the new solvent soluble lactone containing polymeric products which may be prepared by reacting an unsaturated heterocyclic substituted lactone with a polyhydroxy containing compound such as glycerol in the presence of an acid acting catalyst. It has been found that these new polymeric products possess many new and valuable properties which make them useful in industry. It has been found, for example, that the new polymers can be easily cross-linked with polyfunctional materials such as amines, polyhydroxy alcohols, polycarboxylic acids and the like to form insoluble infusible products having attractive properties. Unlike the cross-linking in the case of alkyd resins the cross-linking of the new polymers proceeds at relatively low temperatures so that sensitive materials can be coated with the polymeric lactones. Moreover, these new polymers are cross-linked in an aqueous solution which is as a rule not possible with polymers containing hydroxy groups. As the cross-linking is effected by an addition rather than a condensation, there is no splitting off of components such as water, and for this reason the polymers can be easily utilized for the preparation of castings and moldings.

It was surprising to find that the unsaturated heterocyclic substituted lactones can be polymerized by the present process because beta-lactone groups are reactive under the reaction conditions and either themselves polymerized or are capable of effecting a link upon an addition to other free hydroxy groups in the reaction mixture. It was established, however, that in the reaction according to the present invention, the beta-lactone groups remain unaltered and the addition occurs only between the polyol and the unsaturated heterocyclic groups, such as the vinyl ether groups. It is only in the second step that the beta-lactone groups reacts with the above-mentioned polyfunctional compounds so that a cross-linking of several molecules to an insoluble polymer takes place.

The new unsaturated heterocyclic-substituted lactones of the present invention are those having a propiolactone group substituted with a cyclic structure containing an ethylenic group adjacent to a heteroatom. By "heteroatom" is meant a polyvalent atom other than carbon, such as, for example, oxygen, nitrogen, sulfur, phosphorus, arsenic, antimony, tin, lead silicon and the like. Cyclic groups which contain both the heteroatom and the ethylenic group include among others, the dihydropyranyl, tetrahydropyridine, thiophene, pyrrole, furan, and the like, and their substituted derivatives such as, for example, their halogenated, akylated, alkoxy substituted derivatives and the like. The beta-lactone group is preferably joined to the No. 2- or 3-position relative to the ring heteroatom. A preferred group of these compounds may be illustrated by the following general formula

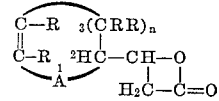

wherein R is a hydrogen, halogen or hydrocarbon radical, A is oxygen or sulfur and $n$ is 1 to 2.

A particularly preferred group of the compounds include those of the general formula

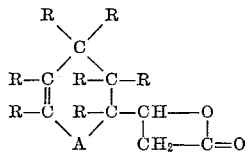

wherein R is hydrogen, halogen, or an alkyl radical, and A is oxygen or sulfur.

Representative examples of these compounds include 2-(3',4'-dihydro-2'-H-pyran-2'-yl)-beta-propiolactone,
2'-(3',4'-dibutyl-3',4'-dihydro-2'-H-pyran-2'-yl)-beta-propiolactone,
2-(3'-chloro-3',4'-dihydro-2'-H-pyran-2'-yl)-beta-propiolactone,
2-(4'-octyl-3',4'-dihydro-2'-H-pyran-2'-yl)-beta-propiolactone,
2-(2',3',4'-trichloro-3',4'-dihydro-2'-H-pyran-2'-yl)-beta-propiolactone,
2-(4'-allyl-3',4'-dihydro-2'-H-pyran-2'-yl)-beta-propiolactone,
2-(4'-cyclohexyl-3',4'-dihydro-2'-H-pyran-2'-yl)-beta-propiolactone,
2-(2',3'-dihydro-thiophen-2'-yl)-beta-propiolactone,
2-(2',3'-dihydrofuran-2'-yl)-beta-propiolactone.

The unsaturated heterocyclic-substituted propiolactones may be prepared by a variety of different ways. They may be prepared, for example, by reacting the corresponding unsaturated heterocyclic-substituted aldehyde with ketene, preferably at a temperature below 20° C. Detailed description of this type of reaction may be found in U.S. 2,478,388 and U.S. 2,518,662.

Temperatures below 20° C., in particular below —10° C., may be suitably used for the purpose. The optimum temperature range depends on the catalyst used. If, for example, boron trifluoride etherate is used as catalyst, the preferred temperature is below —50° C. If other catalysts of the Friedel-Crafts type are employed, such as, for example, zinc chloride, aluminum chloride or iron tri-chloride, the reaction temperatures selected may advantageously be above —50° C. Suitable solvents for the preparation of the lactones are, for example, diethylether, di-isopropyl ether, dioxane and carbon tetrachloride. The use of methylene chloride as a solvent may facilitate the separation of the catalyst and lead to good yields, as there will be less premature polymerization during the final distillation of the unsaturated lactones. As long as the distilling temperature remains below 150° C., there is practically no decomposition of the lactones as a result of decarboxylation.

Particularly useful cyclic vinyl ethers containing a beta-lactone group are those which are substituted by the beta-lactone group in the 2-position and which have the following general formula:

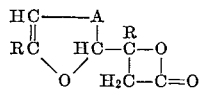

in which —A— represents a group

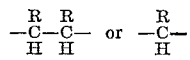

and R represents hydrogen or an alkyl group. Examples of such vinyl ethers are dihydropyran derivatives such as are obtained by addition of ketene to acrolein dimers, methacrolein dimers or vinyl methyl ketone dimers, and also furan derivatives such as are obtained by addition of ketene to furfurol. Good results are obtained with 2-(3',4'-dihydro-2'-H-pyran-2'-yl)-beta - propiolactone. The substituent R in the above formula is preferably hydrogen or a lower alkyl group (1 to 8 carbon atoms) such as methyl, ethyl, etc.

The above-described substituted lactones are reacted according to the process of the invention with a polyhydroxy substituted compound. The polyhydroxy compounds are preferably the polyhydric alcohols and polyhydric phenols which may be both low molecular weight and high molecular weight. The preferred compounds to be used include the following polyhydroxy substituted compounds or derivatives thereof: polyhydric aliphatic alcohols, polyhydric aromatic alcohol partial esters, polyhydric aliphatic alcohol partial ethers, polyhydric aromatic alcohol partial ethers, polyhydric aliphatic alcohol partial ether-esters, and polyhydric aromatic alcohol partial ether-esters.

The polyhydric aliphatic alcohols may be exemplified by glycol, glycerol, 2,4-butanediol, 2,4,6-heptanetriol, 2,4-hexanedienediol-1,6,1,5-cyclopentanediol, pentaerythritol, glucose and other sugars, sugar alcohols (such as mannitol or sorbitol). Examples of suitable high-molecular weight alcohols include polyvinylalcohol, polyallylalcohol, polymers or copolymers of monomers containing groups which are saponifiable or reducible to hydroxyl groups, such as vinyl acetate or acryl esters, polyester and polyether glycols such as, for example, the addition products of alkylene oxides with polyhydric alcohols. Use may also be made of alkyd or epoxide resins having free hydroxy groups, starch and cellulose, which may or may not be partially esterified or etherified, and polyhydroxy phenols, 1,2,4-cyclohexanetriol, and the like. The polyhydric aromatic alcohols may be exemplified by pyrocatechol, resorcinol, phloroglucinol, 1,3-naphthalenediol 1,4,-5,8-naphthalenetetrol, and the like.

The polyhydric aliphatic alcohol partial esters may be exemplified by glycerol monobutyrate, glycerol monostearate, glycerol monohexanoate, glycerol monophthalate, 1,2,6-hexanetriol monostearate, 1,2,6-hexanetriol, monopalmitate, 1,2,5-cyclohexanetriol monoacetate, glycerol monolaurate, glycerol monoacetate, 2,4,6-heptanetriol monooctanoate, and the like.

The polyhydric aliphatic alcohol partial ethers may be exemplified by glycerol monopentyl ether, glycerol monoethyl ether, glycerol monophenyl ether, glycerol monooctyl ether, 1,2,6-hexanetriol monobutyl ether, 1,2,6-hexanetriol monodecyl ether, 1,2,6-cyclohexanetriol monoallyl ether, 2,4,6-heptanetriol monoethallyl ether, glycerol monobutyl ether and the like.

Particularly preferred hydroxy-containing compounds of the above groups to be used in the process of the invention are the organic hydroxy-containing compounds of the group consisting of the polyhydric saturated aliphatic alcohols containing from 3 to 10 carbon atoms, the polyhydric, mononuclear aromatic alcohols containing from 6 to 10 carbon atoms, the polyhydric alcohol partial esters of the polyhydric saturated aliphatic alcohols containing from 3 to 10 carbon atoms and open-chain monocarboxylic acids, containing from 1 to 18 carbon atoms, the polyhydric alcohol partial esters of the polyhydric, mononuclear aromatic alcohols containing from 6 to 10 carbon atoms and open chain monocarboxylic acids containing from 1 to 18 carbon atoms, the polyhydric alcohol partial ethers of the polyhydric saturated aliphatic alcohols containing from 3 to 10 carbon atoms and monohydric saturated alcohols containing from 1 to 10 carbon atoms, and the polyhydric alcohol partial ethers of the polyhydric, mononuclear aromatic alcohols containing from 6 to 10 carbon atoms and monohydric saturated alcohols containing from 1 to 10 carbon atoms.

Examples of this particular preferred group of hydroxy-containing compounds to be used in the process of the invention are glycerol, 2,4-butanediol, resorcinol, phloroglucinol, octanetriol, decanetriol, glycerol stearate, glycerol monocaproate, hexanetriol monolaurate, heptanetriol monovalerate, glycerol monopentadeconate, glycerol monobutyl ether, glycerol monooctyl ether, hexanetriol monodecyl ether, and the like.

Also especially preferred are the polyols obtained by polymerizing unsaturated alcohols, such as allyl alcohol, methyallyl alchohol, butenol and the like, and their copolymers with other unsaturated compounds, such as styrene, alpha-methylstyrene, methyl methacrylate, acrylonitrile, butadiene, isoprene, and the like.

Other preferred polyols include those obtained by reacting alkylene oxides with compounds containng active hydrogen, such as polyols described above, polymercaptans and the like.

Of particular interest are the polyols derived from polyepoxides, and particularly the glycidyl polyethers of polyhydric alcohols or phenols, such as described in U.S. 2,633,458, as by hydration, further reaction with active hydrogen containing compounds, such as polyamines, polycarboxylic acids and the like. Of special interest are the hydroxy-containing glycidyl polyethers of polyhydric phenols themselves such as obtained by controlling the ratio of epichlorohydrin and polyhydric phenols in the reaction processes shown in U.S. 2,633,458.

Of special interest are the alkylol-substituted aromatic compounds, and particularly the polymethylol-substituted aromatic compounds which may contain one or more aromatic rings which may be single, fuzed or joined by one or more connecting radicals. Examples of such include, among others, 2,4,6-trimethylolphenol, 2,4,6-trimethylolnaphthalene, allyl ether of 2,4,6-trimethylolphenol, butyl ether of 2,4,6-trimethylolphenol, novolac resins obtained by reacting phenol or polyhydric phenols with formaldehyde, polymethylol-substituted 2,2-bis(4-hydroxyphenyl) propane, 2,6-dimethylolphenol, 1,5-dihydroxy - 2,6-dimethylolbenzene, 1-hydroxy-4-chloro-2,5-dimethylolbenzene, and 2,4-dimethylol-5-methoxyphenol.

In producing the new polymers of the present invention, one or more of the above-described lactone substituted compounds are reacted with one or more of the above-described polyhydroxy containing compound in the presence of an acid acting catalyst.

Any acid catalyst or acid-acting catalyst may be utilized in the process of the invention. The catalyst is preferably a mineral acid, strong organic acid, Lewis acid or suitable salt. The acids may be organic or inorganic and may be monobasic or polybasic acids. Examples of the inorganic acids that may be utilized as catalysts are sulfuric acid, hydrochloric acid, phosphoric acid, and the like. Examples of the organic acids that may be used in the reaction are p-toluenesulfonic acid, oxalic acid, malonic acid, succinic acid, pimellic acid. Examples of the Lewis acids and salts include boron trifluoride, ammonium chloride or nitrate and the like.

The quantity of the reactants to be added to the reaction mixture will vary over a wide range depending upon the type of products desired. The polyhydroxy compound can be partially converted or completely converted, i.e., have all or only a part of the OH groups reacted. It may be advantageous to carry out the polymerization in such a way that in all of the free hydroxy groups of the polyol are reacted. In this way the number of cross-linkable positions can be adjusted as desired, and the oil-solubility of the products is also as a rule increased, whereas water solubility may be maintained by reacting a minor part of the OH groups only. This latter situation is particularly advantageous where the product is to be used, for example, in the preparation of surface coatings and coatings having an aqueous containing medium. In general the polyhydric compound and the unsaturated substituted lactone reactants are combined in an equivalent ratio of about 1:1 to 3:1. An equivalent amount of the polyhydric compound being sufficient to furnish one OH for every double bond close to the heteroatom.

The reaction may be executed in the presence or absence of solvents or diluents. In case the solvents or diluents are desired, inert chemical compounds, such as benzene, toluene, xylene, cyclohexane, ethyl ether chloroform, tetrahydrofuran, and the like may readily be employed.

The temperature employed should, as much as possible be between 0° C. and 60° C. and diverge only slightly from this range. Preferred temperatures range from about 30° C. to 55° C. Atmospheric, subatmospheric or superatmospheric pressures may be used.

At the conclusion of the reaction, the acidic catalyst is preferably removed by use of a basic ion exchange resin and the polymer recovered by any suitable means as evaporation, precipitation, centrifugation and the like.

The polymeric lactones prepared by the above process will vary from liquids to solids depending upon the type and proportions employed. The polymers are substantially colorless and are soluble in water as well as organic solvents, such as acetone, methanol, benzene, xylene and the like. Analysis indicates that the polymers process contains a plurality of intact lactone groups which may be further reacted as indicated below.

The above-described polymeric lactones can be reacted through the lactone groups with monofunctional compounds such as monohydric alcohols or monoamines to form modified properties such as improved water solubility, and the like. These monofunctional reagents can also be employed in some cases during the polymerization process.

The above-described polymeric lactones are preferably cross-linked by further reaction with polyfunctional compounds such as polymercaptans, polyhydric alcohols, polycarboxylic acids and anhydrides, amines, polyepoxy compounds and the like. Preferred compounds include the polymercaptans, such as, for example, mercapto-substituted hydrocarbons, esters, ethers, urethanes, sulfides and the like, such as glycerol trithioglycolate, pentaerythritol tetrathioglycolate, 1,2,6-hexanetriol trithioglycolate, glycerol trithiolacetate, 1,2,6-hexanetriol trithiolacetate, 1,2,4-butanetriol tri(2-mercaptobutyrate), tri(mercaptobutyl)ether of glycerol, tetra(mercaptoethyl)ether of pentaerythritol, di(mercaptoethyl)ether of 1,4-butanediol, tributyl ether of 1,4,6-trimercapto-2,5,8-octanetriol, esters of mercapto-substituted alcohols and polycarboxylic acids, such as tri(mercaptobutyl)pyromellitate, tri(mercaptobutyl)1,2,4-butanetricarboxylate, trimercaptoethyl trimellitate, tri(mercaptohexyl)1,3,5-pentanetricarboxylate and mercaptoethyl esters of polyacrylic acid, mercaptobutyl esters of copolymers of methacrylic acid and styrene, 2,4,5-trimercaptoluene-1,6-diisocyanate, 1,4-di-(mercaptomethyl)-2,3,5,6 - tetramethylbenzene, trimercaptophenol, bis(2,4-dimercaptobutyl)sulfide, bis(3,5-dimercaptohexyl) sulfide, bis(2,4-dimercaptobutyl)sulfone and the like, and mixtures thereof.

Other highly functional polymercaptans that can be used include others obtained by reacting polyepoxides with hydrogen sulfide. Examples of these are set out in U.S. 2,633,458. A special group of these include those obtained by reacting polyepoxides having more than 2 epoxy groups with hydrogen sulfide. Examples of such polyepoxides include, among others, glycidyl ethers of polyhydric alcohols containing at least three OH groups, such as glycerol, 1,2,6-hexanetriol, pentaerythritol.

Other examples of polymercaptans include those obtained by reacting polythiouranes with hydrogen sulfide as disclosed and claimed in copending patent application Ser. No. 231,852, filed Oct. 19, 1962, and so much of that disclosure pertinent to the preparation of these polymercaptans is incorporated herein by reference.

Other polymercaptans include those obtained by adding hydrogen sulfide to polyunsaturated compounds, such as polybutadienes, polyisoprenes and the like. This addition is preferably accomplished in the presence of catalysts, such as isopropylamine. These mercaptan substituted polymers preferably having molecular weights varying from about 150 to about 10,000 as determined ebullioscopically in toluene.

Another group of special polymercaptans include the mercapto-substituted heterocyclic compounds, such as tri (mercaptomethyl) trioxanes, and the like, as described and claimed in copending application Ser. No. 284,365, filed May 31, 1963, and U.S. 3,297,635, and the aromatic compounds substituted with mercapto-containing side chains, such as described and claimed in copending application Ser. No. 284,322, filed May 31, 1963, now U.S. Patent 3,310,527, and so much of these disclosures pertinent to the preparation of these new polymercaptans is incorporated herein by reference.

Especially preferred polymercaptans to be employed in the process of the invention include the esters of the polyhydric alcohols and mercapto-substituted mono- and polycarboxylic acids, the esters of the mercapto-substituted alcohols and the polycarboxylic acids, the adducts of hydrogen sulfide and polyepoxides, the adducts of hydrogen sulfide and polythiuranes, the mercapto-substituted heterocyclic compounds and the aromatic compound substituted with mercapto-substituted side chains. These special polymercaptans preferably contain no more than 25 carbon atoms.

Other examples include the polycarboxylic acids and their anhydrides, such as the aliphatic, cycloaliphatic, aromatic or heterocyclic acids which may be saturated or unsaturated. Examples include, among others, maleic acid, maleic anhydride, malonic acid, succinic acid, phthalic acid, phthalic anhydride, isophthalic acid, oxalic acid, glutaric acid, adipic acid, 1,2,4-butanetricarboxylic acid, terephthalic acid, diphenyl-1,1'-dicarboxylic acid, pyromellitic acid, pyromellitic anhydride, trimellitic acid, tetrahydrophthalic acid, and partial esters thereof.

Other examples include the amines, i.e., compounds containing a plurality of amino hydrogen. These include the aliphatic, cycloaliphatic, aromatic or heterocyclic amines as well as derivatives thereof. Examples of these materials include, among others, the aromatic amines, such as meta-phenylene diamine, 1,4-diaminobenzene, di(aminophenyl)sulfone, and the like. Examples of the aliphatic amines include, among others, ethylene diamine,
diethylene triamine,
triethylene tetramine,
tetraethylene pentamine,
1,4-aminobutane,
1,3-diaminobutane,
hexamethylene diamine,
3-(n-isopropylamino)propylamine,
N,N'-diethyl-1,3-propanediamine,
hexapropylene heptamine,
penta(1-methyl-propylene)hexamine,
tetrabutylene-pentamine,
hexa(1,1-dimethylethylene)heptamine,
di(1-methylbutylene)triamine,
pentaamylhexamine,
tri(1,2,2-trimethylethylene)tetramine,
tetra(1,3-dimethylpropylene)pentamine,
penta(1,5-dimethylamylene)hexamine,
penta(1,2-dimethyl-1-isopropylethylene)hexamine and
N,N'-dibutyl-1,6-hexanediamine.

Aliphatic polyamines coming under special consideration are the alkylene polyamines of the formula $$H_2N(RNH)_nH$$

wherein R is an alkylene radical, or a hydrocarbon-substituted alkylene radical, and $n$ is an integer of at least one, there being no upper limit to the number of alkylene groups in the molecule.

Other examples include the polyamines possessing cycloaliphatic ring or rings, such as, for example, 1-cyclohexylamino-3 - aminopropane, 1,4 - diaminocyclohexane, 1,3 - diaminocyclopentane, di(aminocyclohexyl)methane, di(aminocyclohexyl)sulfone, 1,3 - di(aminocyclohexyl) propane, 4-isopropyl-1,2 - diaminocyclohexane, 2,4 - di-aminocyclohexane, N,N'-diethyl-1,4-diaminocyclohexane, and the like. Preferred members of this group comprise those polyamines having at least one amino or alkyl-substituted amino group attached directly to a cycloaliphatic ring containing from 5 to 7 carbon atoms. These cycloaliphatic amines are preferably obtained by hydrogenating the corresponding aromatics amine. Thus di(aminocyclohexyl)methane is obtained by hydrogenating methylene dianiline.

Another group of materials that may be used in process of the invention comprise the organo-metallic compounds, such as those having a silicon or boron atom or atoms linked to amino or substituted amino groups. The compounds may also be those organo-metallic compounds wherein the amino group or substituted amino group or groups are attached to carbon, such as in the alkoxysilyl-propylamines as triethoxysilylpropylamines.

Still another group comprise the aminoalkyl-substituted aromatic compounds, such as, for example, di(aminoethyl)benzene, di(aminomethyl)benzene, tri(aminoethyl)benzene, tri(aminobutyl)naphthalene and the like.

Still other materials include the N-(aminoalkyl)piperazines, such as, for example, N-aminoethylpiperazine, N-aminoisopropyl-3-butoxypiperazine, N-aminoethylpiperazine, 2,5-dibutyl-N-aminoethylpiperazine, 2,5-dioctyl-N-aminoisobutylpiperazine and the like. Coming under special consideration are the N-(aminoalkyl)piperazines wherein the alkyl group in the aminoalkyl portion of the molecule contains no more than 6 carbon atoms, and the total molecule contains no more than 18 carbon atoms.

Coming under special consideration, particularly because of the better control over the rate of cure obtained, are the acetone soluble derivatives of the above polyamines as may be obtained by reacting the above-described polyamines with other materials to remove some but not all of the active amino hydrogen.

A group of such materials include those acetone soluble products obtained by reacting the polyamines with a monoepoxide. Examples of these reactants include, among others, ethylene oxide, propylene oxide, styrene oxide, phenyl glycidyl ether, allyl glycidyl ether, octadecyl glycidyl ether, tolyl glycidyl ether, chlorophenyl glycidyl ether, naphthyl glycidyl ether, diacetate of monoglycidyl ether of glycerol, dipropionate of the monoglycidyl ether of glycerol, epichlorohydrin, 1,2-decylene oxide, glycidyl acetate, glycidyl benzoate, glycidyl propionate, glycidyl acrylate, glycidyl methyl maleate, glycidyl stearate, glycidyl oleate, butyl 1,2-epoxypropionate and the like.

Other examples include the polyepoxide, such as the glycidyl polyethers of polyhydric phenols and polyhydric alcohols. Other examples of polyepoxides are set out in U.S. 2,633,458, and so much of the disclosure of that patent relative to polyepoxides is included herein by reference.

Particularly preferred compounds to be used include the organic compounds possessing a plurality of OH groups as described herein above for the first step in the reaction.

The cross-linking is preferably accomplished by mixing the polyfunctional material with the polymeric lactone with or without a catalyst and at a moderate temperature.

The proportion of the reactants to be employed may vary over a wide range. Most cases, it is preferred to utilize approximately chemical equivalent amounts, that is, one active group for every lactone group in the polymer. However, smaller amounts of a cross-linking agent may be employed as desired to obtain the properties needed for that particular application. Solvents that may be employed for the reaction may include water and inert organic solvents such as tetrahydrofuran chloroform and the like.

Temperatures employed indicate in the cross-linking are preferably those between 20° C. and 100° C. but higher temperatures can be employed particularly where the cross-linking is to be carried out in the melt. Temperatures of up to 100° C. are possible in this case.

The curing process may be carried to completion without substantial interruption or it may be stopped at any point short of completion. Incomplete curing may be used for producing products which may be further worked and eventually completely polymerized. The product may, for example, be transferred to a mold of any desired configuration and again subjected to the curing process.

The hard surfaced resins obtained from the curing process may be milled, drilled, cut and machined to produce many desired products of commerce, such as buttons, pins, handles, table coverings, etc. The molten resins may also be cast into sheets, rods, tubes, thin films, filaments, fibers, etc.

The resinous products of the invention may be modified in any of the variety of ways by the use of large numbers of modifying substances. Some of these substances may be added to the mixture of the polymer and cross-linking agent prior to or during the resin-forming reaction, while others may be added prior to or during the final curing process. Such modifying agents include the conventional plasticizers, stabilizers, lubricants, dyes, pigments and fillers. Examples of such agents are asbestos, sand, clay, talc, mica, wood flour, cotton, pitch, asphalt, shellac, copal, camphor, naphthalene, anthracene, dioctyl phthalate, dibutyl phthalate, tricresyl phosphate, and the like. An important group of modifiers consists of the organic plastic substances, such as protein plastics, phenol-aldehyde condensation products, vinyl-type addition products, such as polystyrene, polyvinyl chloride, polyvinylidenechloride, polymethyl methacylate, polymethacrylonitrile, and the like.

The cured polymers prepared according to the present invention are also particularly useful for coatings, surface coatings, finishing agents for the impregnation of paper, textiles, or as curing agents for the polyepoxides.

To illustrate the manner in which the invention may be carried out the following examples are given. It is to be understood however, that the examples are for the purpose of illustration and that they are not to be regarded as limiting the invention in any way, unless otherwise indicated, parts referred to in the examples are parts by weight.

EXAMPLE I

This example illustrates the preparation of a polymeric lactone from beta-dihydro-2-pyranyl-beta-propiolactone and a glycerol/ethylene oxide-propylene oxide adduct.

11.85 parts of a glycerol/ethylene oxide-propylene oxide adduct having a molecular weight of approximately 3,000 was dissolved with 3.08 parts of beta-dihydro-2-pyranyl-beta-propiolactone and .005 part of p-toluene sulfuric acid in 30 parts of dry tetrahydrofuran. This mixture was heated for 55 hours at 50° C. At that time, the catalyst was removed by way of a basic ion exchanger and the solution precipitated in ether-petroleum ether (1:1 ratio). 11.8 parts of a liquid polymer which was soluble in water and organic solvents, such as acetone, was obtained. Analysis indicated that the product had 0.13 part of the lactone component per part of polymer.

3.4 parts of the above-described polymer was dissolved in 10 parts of water and mixed with a solution of 0.174 part of hexamethyldiamine in 2 parts of water.

The above solution was heated for 2 hours at 90° C. A hard solid product which was insoluble in organic solvents, such as acetone, and water was obtained.

EXAMPLE II

This example illustrates the preparation of a polymer from beta-dihydro-2-pyranyl-beta-propiolactone and a hydroxy containing alkyd resin.

2.06 parts of an alkyd resin prepared from phthalic anhydride and glycerol and having a hydroxyl value of 292 milliequivalents per 100 parts of resin was heated with 0.924 part (.006 mol) of beta-dihydro-2-pyranyl-beta-propiolactone, .005 part of p-toluene sulfonic acid and 20 parts of tetrahydrofuran. This mixture was heated at 50° C. for three hours. At that time, the catalyst was removed by means of a basic ion exchanger and the product was precipitated from a 1:1 ether-petroleum ether mixture. The resulting product was a low melting polymer which was soluble in organic solvents such as acetone and benzene and had $1.1 \times 10^{-3}$ mols of the lactone per part of alkyd resin.

1.28 parts of polyol prepared above was combined with hexamethylenediamine as shown in Example I and the mixture heated for 2 hours at 90° C. The resulting product was a hard insoluble cross-linked product.

EXAMPLE III

A polymeric lactone was prepared from an alkyd resin and beta-dihydro - 2 - pyranyl - beta - -propiolactone by the method shown in Example II wherein the product had $1.24 \times 10^{-3}$ mols of beta - dihydro-2-pyranyl-beta-propiolactone per part of the resin. 1.28 parts of this product was dissolved in 10 parts of tetrahydrofuran and this mixture was heated with a solution of 0.146 part ($1.25 \times 10^{-3}$ mols) hexamethylenediamine in 10 parts of dry tetrahydrofuran. After being heated for 9 hours at 100° C. a hard insoluble product was obtained.

A film prepared from a related product containing $1.0 \times 10^{-3}$ mol of beta-dihydro - 2 - pyranyl-beta-propiolactone per part of alkyl resin and hexamethylenediamine (combined in a ratio of 1.4 parts of polymer to .06 part of diamine) was insoluble in solvents after being heated at 100° C. for 6 hours.

EXAMPLE IV

The following table shows a number of polymers prepared from beta-dihydro - 2 - pyranyl - beta-propiolactone and a variety of polymers. The reaction products were washed with a solution of sodium bicarbonate and water and dried over magnesium sulfate. Where required, further purification was obtained by dissolving and precipitating from ether-petroleum ether mixtures.

| No. | G. of polyol (mol) | G. of DPL (mol)[1] | Catalyst | Solvent | Temperature, °C. | Yield of adduct, g. | G. Equivalent Calc'd. | Weight Found |
|---|---|---|---|---|---|---|---|---|
| 1 | 1, Glycerol (0.01) | 4.6 (0.03) | H$_2$SO$_4$ | None | 20 | 3.75 | 184 | 180 |
| 2 | do | 4.6 (0.03) | HCl | do | 20 | 5.15 | 184 | 183.5 |
| 3 | do | 4.6 (0.03) | p-Toluene-sulphonic acid. | do | 20 | 5.1 | 184 | 180 |
| 4 | do | 3.1 (0.02) | do | do | 20 | 3.2 | 200 | 195 |
| 5 | 1.1, Pentaerythritol (0.0081) | 8 (0.052) | do | Chloroform | 50 | 8.2 | 188 | 182 |
| 6 | do | 4 (0.026) | do | do | 20 | 4.3 | 199 | 195 |
| 7 | do | 2.262 (0.0147) | do | do | 60 | 2.8 | 222 | 219 |
| 8 | 1.48, Heptanetriol (1,4,7) (0.01) | 4.62 (0.03) | do | do | 40 | 3.6 | 202 | 200 |
| 9 | 1.8, d-Glucose (0.01) | 7.7 (0.05) | do | do | 30 | 6.1 | 199 | 201 |
| 10 | 1.82, Mannitol (0.01) | 9.24 (0.06) | do | do | 50 | 2 | 184 | 180 |
| 11 | 0.63, partially saponified polyvinyl ocetate (0.003 mol OH). | 0.924 (0.006) | do | Tetrahydrofuran | 50 | 0.9 | | ([2]) |

[1] Beta-dihydro-2-pyronyl-beta-propiolactone.
[2] 0.33 g. DPL/g. adduct.

The above polymeric lactones were combined with equivalent amounts of each of the following polyfunctional reactants: hexamethylene diamine, glycerol, 1,5-pentanedithiol, 1,2,4-butane tricarboxylic acid, diglycidyl ether of 2,2-bis(4 - hydroxyphenyl)propane. Insoluble cured products were obtained.

EXAMPLE V

The process in Example IV is repeated with the exception that the polyol is starch, cellulose, and polyvinyl alcohols. Related results are obtained in each case.

We claim as our invention:

1. A solvent soluble polymeric reaction product of (1) an ethylenically unsaturated heterocyclic-substituted beta-lactone of the general formula

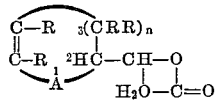

wherein R is a member of the group consisting of hydrogen, halogen and hydrocarbon radicals, A is a member of the group consisting of oxygen, nitrogen, and sulfur atoms, and $n$ is 1 to 2, and (2) an organic compound containing a plurality of alcoholic OH group.

2. A product as in claim 1 wherein the lactone compound is beta-dihydro-2-pyranyl-beta-propiolactone.

3. A product as in claim 1 wherein the organic compound containing OH group is glycerol.

4. A product as in claim 1 wherein the organic compound containing the OH group is an adduct of glycerol and an alkylene oxide.

5. A product as in claim 1 wherein the organic compound containing the OH group is a hydroxy containing phthalic anhydride/glycerol alkyd resin.

6. A benzene soluble reaction product of (1) a vinyl ether substituted lactone of the structure

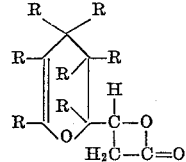

wherein R is a member of the group consisting of hydrogen and alkyl radicals containing 1 to 8 carbon atoms, and (2) a polyhydroxy containing compound.

7. An insoluble infusible product obtained by reacting the reaction product of claim 1 with a polyfunctional compound of the group consisting of amines, polyhydric alcohols, polycarboxylic acids, polyepoxides, and the polythiols.

8. A cured product obtained by reacting the soluble reaction product of claim 1 with an aliphatic polyamine containing up to 12 carbon atoms.

9. A process for preparing solvent soluble polymeric lactones which comprises reacting a vinyl ether substituted lactone of the structure

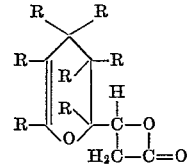

wherein R is a member of the group consisting of hydrogen and an alkyl radical containing 1 to 8 carbon atoms, with an organic compound containing aliphatic OH groups in the presence of an acid acting catalyst at a temperature between 30 and 100° C.

10. A process as in claim 9 wherein the lactone compound is beta-dihydro - 2 - pyranyl - beta-propiolactone.

11. A process as in claim 9 wherein the organic compound containing the OH group is a glycerol-alkylene oxide adduct.

12. A process as in claim 9 wherein the catalyst is a Lewis acid catalyst.

13. A process as in claim 9 wherein the organic compound containing the OH group is a member of the group consisting of cellulose, starch and polyvinyl alcohol.

References Cited

UNITED STATES PATENTS

| | | | |
|---|---|---|---|
| 3,116,301 | 12/1963 | Williams et al. | 260—79 |
| 3,268,486 | 8/1966 | Klootwijk | 260—78.3 |
| 3,272,764 | 9/1966 | Mueller et al. | 260—861 |
| 3,336,265 | 8/1967 | Palm et al. | 260—78.3 |

MURRAY TILLMAN, *Primary Examiner.*

JOHN T. GOOLKASIAN, *Assistant Examiner.*